Figure 1:
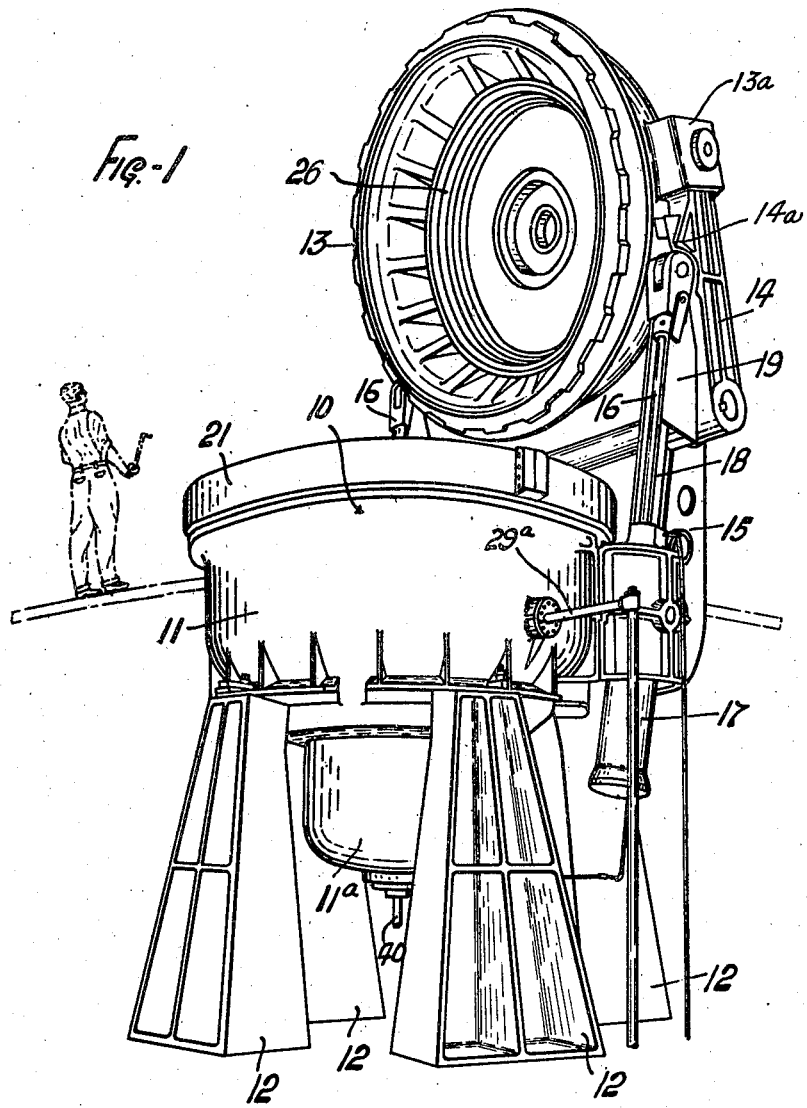

July 29, 1947.　　G. P. BOSOMWORTH ET AL　　2,424,915
VULCANIZING APPARATUS
Original Filed Aug. 3, 1940　　2 Sheets-Sheet 1

INVENTORS
GEORGE P. BOSOMWORTH
AND
HANS G. HAGER
BY  Ely & Frye
ATTORNEYS

July 29, 1947.    G. P. BOSOMWORTH ET AL    2,424,915
VULCANIZING APPARATUS
Original Filed Aug. 3, 1940    2 Sheets-Sheet 2
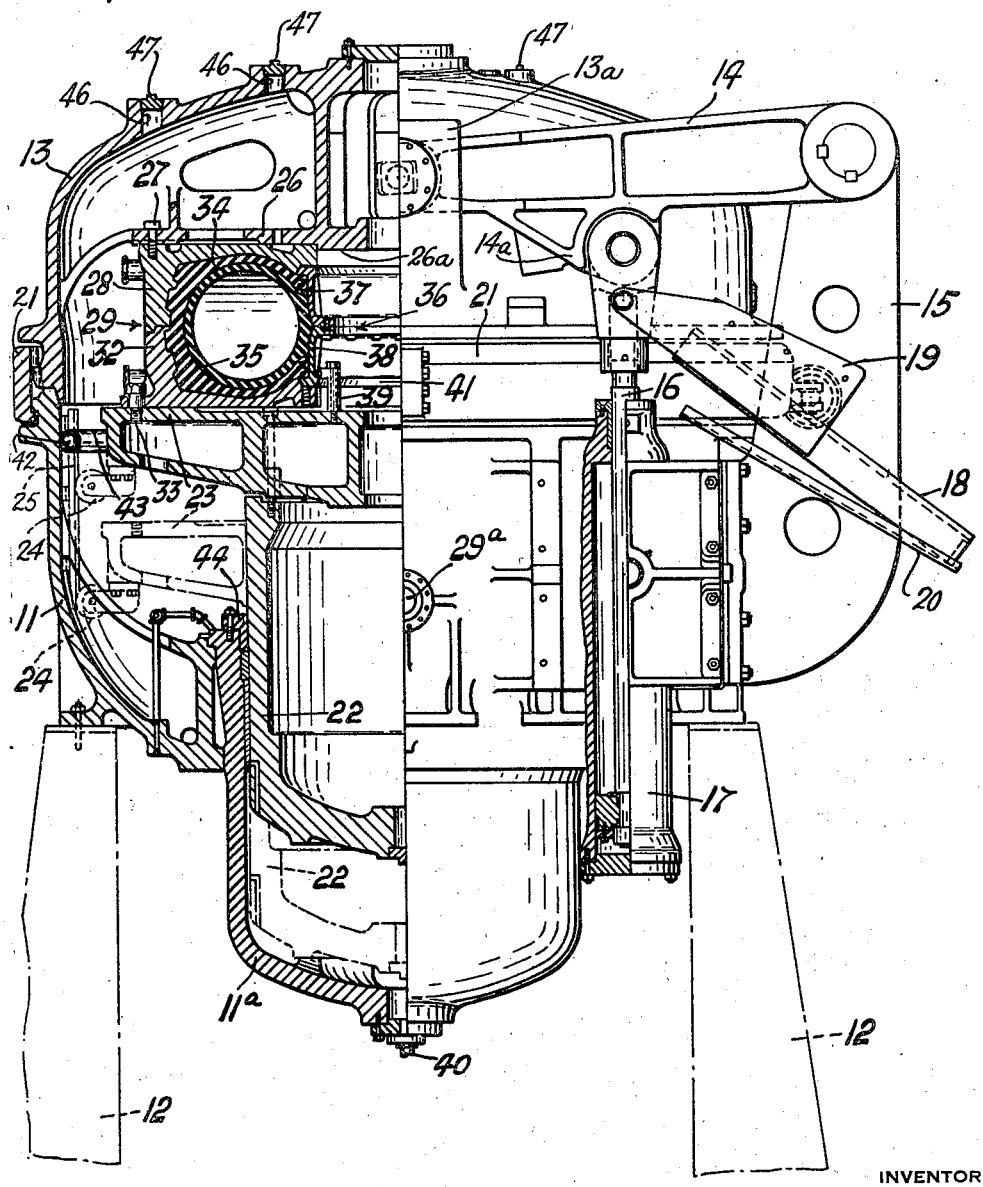
INVENTORS
GEORGE P. BOSOMWORTH
AND
HANS G. HAGER
BY
Ely + Frye
ATTORNEYS Patented July 29, 1947

2,424,915

UNITED STATES PATENT OFFICE 2,424,915

VULCANIZING APPARATUS

George P. Bosomworth and Hans G. Hager, Akron, Ohio, assignors to The Firestone Tire & Rubber Company, Akron, Ohio, a corporation of Ohio Original application August 3, 1940, Serial No. 350,540. Divided and this application June 1, 1943, Serial No. 489,260

4 Claims. (Cl. 18—17)

This invention relates to apparatus for vulcanizing rubber articles and more especially it relates to apparatus for vulcanizing articles of relatively large size.

The chief object of the invention is to devise an improved apparatus for the vulcanization of very large tires, for the problems of vulcanization, cooling, and ejection of the tire from the mold are quite different from those encountered in the production of tires of ordinary sizes.

Another object of the invention is to provide in a simple manner for separating the sections of large molds after the vulcanization of the article therein has been effected.

A further object of the invention is to provide in an improved manner for cooling the tire mold.

The foregoing and other objects will be manifest from the following specification, in which the invention is described with particular reference to the accompanying drawings, of which:

Figure 1 is a perspective view of vulcanizing apparatus embodying the invention; and Figure 2 is a side elevation, partly in section, of the apparatus shown in Figure 1, with the apparatus in operative condition and a vulcanizable article positioned therein.

The application is a division of our co-pending application for Letters Patent, Ser. No. 350,540, filed August 3, 1940, now Patent No. 2,339,541, issued January 18, 1944.

Referring specifically to the vulcanizer shown in Figure 1, it is seen that it includes a pot heater 10 which comprises a casing member 11 which is supported by several legs 12. This casing member 11 has a cover 13 provided therefor which is adapted to be snugly received on and over the open upper end of the casing 11. The cover 13 is carried by lever arms 14 that are journaled upon upwardly extending arms 15 that are formed integral with, or secured to, the rear portion of the casing 11. Movement of the cover 13 is controlled by the piston rods 16 that engage with the lever arms 14 intermediate the ends thereof. The piston rods 16 are received in cylinders 17, pivotally mounted on the casing 11 and adapted to project and retract the piston rods 16 whereby the cover 13 is raised or lowered, as desired.

Safety means are provided to prevent accidental lowering of the cover 13. These means comprise channel shaped members or struts 18 that are pivotally connected at their upper ends to the piston rods 16 and are disposed at the rear thereof, each of said struts having a counterweight 19 mounted thereon adjacent its pivoted end. The free ends of the struts normally rest in respective channelled guides 20, as clearly shown in Fig. 2. When the piston rods 16 have raised the cover 13 to the fully open position shown in Fig. 1, the piston rods 16 are inclined somewhat rearwardly toward their upper ends, and the struts 18, which otherwise would hang vertically by gravity, are urged into position against the piston rods 16 by reason of the counterweights 19, their lower ends thereby being positioned over the tops of the cylinders 17, in position to engage the latter. Hence, downward movement of the piston rods is prevented until safety means (not shown) move the channel shaped members 18 from their safety position shown in Fig. 1 to an oblique position wherein their free ends are over the guides 20. In case of failure of pressure in the cylinders 17, the struts 18 act as props which engage the tops of cylinders 17 to prevent descent of the cover 13.

As an additional safety measure, each lever arm 14 is formed with hook-like formation 14a that extends partly around the clevis that is mounted on the end of piston rod 16, concentrically of the pivot pin securing said clevis to said lever arm. In case of failure of said pivot pin, the clevis would cradle in the concave surface of formation 14a, thereby supporting the arm 14 and preventing the cover 13 from dropping.

Furthermore, to provide protection in case of failure of the pivot pins that connect the cover 13 to the ends of lever arms 14, heavy guards or housings 13a are cast integral with the cover, at said pivot points, said guards being open on one side to admit the end portions of said lever arms. Thus upon failure of one or both of said pivot pins, the guards would prevent the cover from dropping out of engagement with the lever arms.

Figure 2 shows the apparatus of Figure 1 when the heater 10 is in closed position. A locking ring 21 is mounted upon the casing 11 and engages with outwardly extending lugs formed on the outer edge of both portions of the heater, as described specifically in Bosomworth Patent 2,200,871. This arrangement is such that the cover member 13 cannot be moved upwardly with relation to the casing member 11 until the locking ring 21 is in proper position with relation to the cover 13.

In the present construction, a relatively large ram 22 is received in a fluid pressure cylinder 11a axially positioned in the lower part of the casing member 11. This ram 22 has a platen 23 secured to its top, and circumferentially spaced roller arms 24 are carried by the platen 23 at the periphery thereof. These roller arms 24 engage with vertically directed sections of track or guide bars 25 to guide the ram 22 in its vertical movement, since the ram is adapted to reciprocate vertically in the cylinder.

Both sections of the heater 10 are adapted to have an annular mold section secured thereto, of which upper mold section is designated 28 and lower mold section is designated 32, the mold as a unit being designated 29. The cover 13 has a flat head portion 26 formed therein, which head portion is integral with the remainder of the cover and is at the lower portion thereof when the cover is horizontal. Said head portion 26 does not extend entirely across the entire cover, but has portions of its perimeter spaced from the cover so that heating fluid may circulate between head and cover and thus provide adequate heat transfer to the mold. The head 26 is formed on its lower face with an annular axial boss 26a which is snugly received within the central opening of the upper mold section 28, said boss serving to effect accurate positioning of the mold section, and to sustain some of the weight thereof when the cover is in vertical position thus relieving the screws that secure the mold section to the head of much strain. Mold section 28 is secured to the head 26 by cap screws 27 that extend through the head 26 from the upper side thereof. To provide access to the screws 27, the cover 13 is formed with openings 46, 46 directly over each of said screws to admit a suitable socket wrench for loosening or tightening the screws as desired. The openings 46 normally are closed by pipe plugs 47 to prevent escape of gaseous fluid from the interior of the heater.

The lower mold section 32 is secured to platen 23 by cap screws 33. The latter are of shoulder type wherein the shoulder is tightened against the platen, but the heads do not tightly engage the mold. The holes in the mold through which screws 33 extend are of such size as to provide liberal diametric clearance about the screws, the arrangement being such that the mold section 32 may shift its position slightly relatively of the platen. In mounting the mold in the heater, the upper mold section 28, because of its great weight, is secured to cover 13 while the latter is in closed position, and thereafter cannot be shifted relatively of the cover. By providing for the shifting of the lower mold section 32 relatively of the platen 23, said lower mold section can be moved accurately into registry with upper mold section 28 simply by lowering the latter into mating relation therewith.

The mold 29 is utilized for vulcanizing a pneumatic tire casing 34. The tire 34 has an expansible core or airbag 35 positioned therein, which core is held in place by means of a circumferentially split bead-engaging ring 36. The bead ring 36 comprises an upper and a lower ring, 37 and 38, respectively, which rings are substantially L-shaped in section, that are secured together and have their outer legs engaged with the bead portions of the tire 34 as shown. The unit consisting of the tire, core, and bead rings is detachably clamped to the lower mold section 32 by means of a plurality of circumferentially spaced inverted L-shaped clamps 39. The clamps 39 are engaged with a flange 41 formed on the lower ring section 38 and are bolted to the upper surface of the platen 23, so that by the tightening of these clamps, the tire 34 is substantially brought into tight engagement with the lower mold section. It will be noted that the peripheral edges of the outer leg portions of bead ring 36 are beveled and extend in a radially outward direction from their outer lateral to their inner lateral surfaces. The corresponding surfaces of the mold 29 are complementally shaped and adapted to engage with these peripheral and outer lateral edges of the bead ring 36 whereby the ring and tire carried thereby are centrally and properly positioned with relation to the mold 29.

Fluid for raising the ram 22 is introduced into cylinder 11a through a pipe 40 which connects to a suitable fluid pressure source (not shown). Steam for vulcanizing the tire 34 is admitted to the heater by way of supply pipe 29a. Suitable pipe connections (not shown) are provided for introducing heated fluid under pressure to the expansible core 35 in the usual manner.

A pipe 42 is mounted within the casing member 11 adjacent the upper edge thereof, as shown in Figure 2. This pipe 42 extends completely around the member 11 except for the portions thereof occupied by the track sections 25 and the roller arms 24, and it has a plurality of circumferentially spaced holes 43 formed in the upper, inner surface thereof, said holes being so arranged that fluid discharged therefrom will impinge upon the entire periphery of the upper mold section 28.

In operation of the vulcanization apparatus shown, the green or unvulcanized tire 34, having expansible core 35 therein, is placed upon the lower mold section 32 while the cover 13 is raised. The ram 22 at this time may be in its lower position, as indicated in dotted lines in Figure 2, but if not, it is now moved to such position. Then the clamps 39 are tightened to draw the lower bead of the tire into engagement with the surface of mold section 32. This action also engages the lower edge of the bead ring 36 with the inner edge of the mold section 32. Next the cover 13 is lowered and locked in position, after which fluid is introduced into the cylinder 11a, through the pipe 40, and the ram 22 is forced upwardly. This forces the tire 34 into engagement with the upper mold section 28 and engages the upper edge of the bead ring 36 with the mold section 28 whereby the tire 34 is completely enclosed. Suitable fluid pressure is then set up within the expansible core 35 to distend the tire 34 into tight contact with the mold 29, after which vulcanization steam is introduced into the pot heater 10 through the pipe 29a. After vulcanization has been effected, the steam confined within the pot heater is allowed to exhaust therefrom and the expansible core 35 also has the pressure therein removed. Then cooling fluid is forced into the pot heater through the pipe 42 until the mold 29 is completely covered with liquid. This cooling fluid is sprayed onto the upper mold section 28, and, of course, flows downwardly over the periphery of mold section 32 and ultimately collects in the bottom of the pot heater 10. Only a portion of the steam and air confined within the pot heater is permitted to escape, whereby such confined gas sets up appreciable pressure within the heater. When about 80 lb. per inch pressure is set up in the heater 10, the cylinder 11a is evacuated. This leaves the ram 22 free for downward movement and the entire weight of the ram, platen, and lower mold section are all carried by the cover 13 through the vulcanized tire 34 and such tensional force set up thereon acts to break the mold sections 28 and 32 apart slightly. However, these mold sections are not completely separated due to the relatively large adhesive forces between the mold and the tire. The pressure in the heater 10 then forces water between the mold sections and gradually forces the ram 22 downwardly to break more and more of the tire surface from engagement with the mold surfaces until the upper mold section is completely freed from the lower mold section and the tire. The tire 34 and the bead rings 36 remain in engagement with the lower mold section 32 whereby the cover 13 is free to be raised to its uppermost position and expose the interior of the pot heater. This cover 13 is raised only after a suitable exhaust port (not shown) is opened to drain the water from the pot heater 10. Then the ram 22 is moved to its uppermost position and the tire and core assembly are removed from the mold section 32, whereupon the vulcanizer unit is ready for another vulcanization cycle.

Practice of the present invention permits the use of a so-called single acting ram 22 and avoids the necessity of having a double acting ram to force one mold section into engagement with the second mold section and subsequently to break apart the mold sections by exerting a tensional force thereon. Such double acting rams are difficult to maintain in good operative condition. Also, the present invention obtains double use of the cooling fluid. The ram 22 is sealed in the casing 11a by a gasket ring 44 carried by the upper end of the casing.

This invention is adapted for the production of very large tires, such as those used for earth moving equipment wherein the dimensions are on the order of 30 inches sectional width, 100 inches over-all diameter, and the weight of the tire is on the order of 1½ tons. In the manufacture of such tires there are new problems in obtaining sufficient heat and pressure to vulcanize properly such a large mass of rubber and fabric and after vulcanization to cool and separate the tire from the mold. These problems differ from those encountered in the production of small tires, and are satisfactorily solved by the apparatus disclosed therein.

While a complete embodiment of the invention has been illustrated and described herein, it will be understood that various modifications thereof may be made without departing from the scope of the invention as defined in the appended claims.

What is claimed is:

1. In vulcanization apparatus, the combination of a heater having separable top and bottom sections, respective mold sections secured to each of the sections of said heater, and a tubular member having apertures in the upper side thereof positioned adjacent the top of the bottom heater section circumferentially hereof immediately adjacent the inside wall thereof, said apertures being so arranged that cooling fluid can be sprayed therefrom onto the entire periphery of the upper mold section.

2. In vulcanization apparatus, the combination of a heater comprising a lower casing and a cover movable relatively thereof to open and close the heater, lever arms fulcrumed on fixed points and having their free ends pivotally connected to opposite sides of the cover, fluid pressure cylinders swivelled at fixed points and having piston rods pivotally connected to the respective lever arms intermediate the ends thereof, and hook-like formations on the respective lever arms positioned adjacent the pivotal connections of the piston rods with the latter adapted to engage the ends of the piston rods to prevent descent of the cover from open position upon failure of said pivotal connections at the ends of the piston rods.

3. In vulcanization apparatus, the combination of a heater comprising a lower casing and a cover movable relatively thereof to open and close the heater, lever arms fulcrumed at fixed points and having their free ends pivotally connected to opposite sides of the cover, fluid pressure cylinders swivelled at fixed points and having piston rods pivotally connected to the respective lever arms intermediate the ends thereof for swinging the lever arms to raise and lower the cover, and housing formations formed on the cover about the pivotal connections of the lever arms with the latter engaging the ends of the lever arms to prevent separation thereof from the cover upon failure of the pivotal connections between the lever arms and cover.

4. A combination as defined in claim 3 including hook-like formations on the lever arms adjacent the pivotal connections of the piston rods with the latter adapted to engage the ends of the piston rods upon failure of said pivotal connections, thereby to prevent further relative movement between piston rods and cover, thus preventing descent of the cover.

GEORGE P. BOSOMWORTH.
HANS G. HAGER.

REFERENCES CITED

The following references are of record in the file of this patent:

UNITED STATES PATENTS

| Number | Name | Date |
| --- | --- | --- |
| 1,892,942 | Gammeter | Jan. 3, 1933 |
| 2,174,188 | Heintz | Sept. 26, 1939 |
| 2,198,493 | Freeman | Apr. 23, 1940 |
| 2,279,540 | Voth et al. | Apr. 14, 1942 |
| 2,291,506 | Shook et al. | July 28, 1942 |
| 2,316,352 | Minns et al. | Apr. 13, 1943 |

FOREIGN PATENTS

| Number | Country | Date |
| --- | --- | --- |
| 174,146 | Switzerland | Dec. 31, 1934 |